US009953633B2

United States Patent
Chu et al.

(10) Patent No.: US 9,953,633 B2
(45) Date of Patent: Apr. 24, 2018

(54) SPEAKER DEPENDENT VOICED SOUND PATTERN TEMPLATE MAPPING

(71) Applicant: Malaspina Labs (Barbados), Inc., Vancouver (CA)

(72) Inventors: Clarence Chu, Vancouver (CA); Alireza Kenarsari Anhari, Vancouver (CA)

(73) Assignee: MALASPINA LABS (BARBADOS), INC., St. Michael (BB)

( * ) Notice: Subject to any disclaimer, the term of this patent is extended or adjusted under 35 U.S.C. 154(b) by 0 days.

(21) Appl. No.: 14/806,736

(22) Filed: Jul. 23, 2015

(65) Prior Publication Data

US 2016/0027432 A1 Jan. 28, 2016

Related U.S. Application Data

(60) Provisional application No. 62/029,560, filed on Jul. 27, 2014.

(51) Int. Cl.

| | | |
|---|---|---|
| *G10L 15/00* | (2013.01) | |
| *G10L 15/06* | (2013.01) | |
| *G10L 15/02* | (2006.01) | |
| *G10L 15/04* | (2013.01) | |
| *G10L 15/12* | (2006.01) | |
| *G10L 15/20* | (2006.01) | |
| *G10L 15/08* | (2006.01) | |

(52) U.S. Cl.
CPC ............. *G10L 15/06* (2013.01); *G10L 15/02* (2013.01); *G10L 15/04* (2013.01); *G10L 15/12* (2013.01); *G10L 15/20* (2013.01); *G10L 2015/081* (2013.01); *G10L 2015/088* (2013.01)

(58) Field of Classification Search
CPC ......... G10L 15/20; G10L 15/02; G10L 15/04; G10L 15/06; G10L 15/12; G10L 2015/081; G10L 2015/088; G10L 15/063; G10L 15/16; G10L 25/30; G10L 25/51; G10L 25/78
USPC ................................ 704/221, 276, 243, 244
See application file for complete search history.

*Primary Examiner* — Thierry L Pham
(74) *Attorney, Agent, or Firm* — Ronald Fernando

(57) ABSTRACT

Various implementations disclosed herein include a training module configured to produce a set of segment templates from a concurrent segmentation of a plurality of vocalization instances of a VSP vocalized by a particular speaker, who is identifiable by a corresponding set of vocal characteristics. Each segment template provides a stochastic characterization of how each of one or more portions of a VSP is vocalized by the particular speaker in accordance with the corresponding set of vocal characteristics. Additionally, in various implementations, the training module includes systems, methods and/or devices configured to produce a set of VSP segment maps that each provide a quantitative characterization of how respective segments of the plurality of vocalization instances vary in relation to a corresponding one of a set of segment templates.

20 Claims, 8 Drawing Sheets

SPEAKER DEPENDENT VOICED SOUND PATTERN TEMPLATE MAPPING

RELATED APPLICATIONS

This application claims the benefit of U.S. Provisional Patent Application No. 62/029,560, entitled "Systems & Methods for Speaker Dependent Voice Activity Detection," filed on Jul. 27, 2014, and which is incorporated by reference herein.

TECHNICAL FIELD

The present disclosure relates to audible signal processing, and in particular, to detecting a voiced sound pattern spoken by a particular speaker in noisy audible signal data.

BACKGROUND

The ability to recognize a voiced sound pattern (e.g., a keyword or a phrase), as vocalized by a particular speaker, is a basic function of the human auditory system. However, this psychoacoustic hearing task is difficult to reproduce using previously known machine-listening technologies because spoken communication often occurs in adverse acoustic environments that include ambient noise, interfering sounds, and background chatter of other speakers. The problem is further complicated because there is often some variation in how a particular speaker vocalizes multiple instances of the same voiced sound pattern (VSP). Nevertheless, as a hearing task, the unimpaired human auditory system is able recognize VSPs vocalized by a particular speaker effectively and perceptually instantaneously.

As a previously known machine-listening process, recognition of a VSP as vocalized by a particular speaker includes detecting and then matching a VSP to the vocal characteristics of the particular speaker. Known processes that enable detection and matching are computationally complex, use large memory allocations, and yet still remain functionally limited and highly inaccurate. One persistent problem includes an inability to sufficiently train a detection and matching system using previously known machine-listening technologies. For example, previously known technologies are limited to using a single vocalization instance in a training process, because the processes employed cannot jointly utilize multiple vocalization instances without excessive multiplicative increases in computational complexity and memory demand. However, a single vocalization instance does not provide a sufficient amount of information to reliably train a VSP detection module.

Moreover, due to the computational complexity and memory demands, previously known VSP detection and speaker matching processes are characterized by long delays and high power consumption. As such, these processes are undesirable for low-power, real-time and/or low-latency devices, such as hearing aids and mobile devices (e.g., smartphones, wearables, etc.).

SUMMARY

Various implementations of systems, methods and devices within the scope of the appended claims each have several aspects, no single one of which is solely responsible for the attributes described herein. After considering this disclosure those of ordinary skill in the art will understand how the aspects of various implementations are used to enable speaker dependent voice activity detection (SDVA). In accordance with various implementations, SDVA enables a device to detect a user selected keyword or phrase (i.e., a voiced sound pattern, VSP) in a continuous stream of audio when spoken by the specific user, and to the exclusion of other speakers. In some implementations, a SDVA system includes a training module and a detection module. The detection module uses keyword characterizations to score how well subsequently received portions of an audible signal match the keyword characterizations that are used as the basis of one or more detection (and/or matching) threshold metrics. The training module allows a user to provide multiple examples of a keyword (i.e., a VSP) that are used to enable the detection module with the one or more detection (and/or matching) threshold metrics. Identifying features of the keyword examples are then extracted and characterized by the training module. In various implementations, the training module includes systems, methods and/ or devices configured to produce a set of segment templates from a concurrent segmentation of a plurality of vocalization instances of a VSP vocalized by a particular speaker, who is identifiable by a corresponding set of vocal characteristics. Each segment template provides a stochastic characterization of how each of one or more portions of a VSP is vocalized by the particular speaker in accordance with the corresponding set of vocal characteristics. Additionally, in various implementations, the training module includes systems, methods and/or devices configured to produce a set of VSP segment maps that each provide a quantitative characterization of how respective segments of the plurality of vocalization instances varies in relation to a corresponding one of a set of segment templates.

Some implementations include a method of producing a set of segment templates from a concurrent segmentation of a plurality of vocalization instances of a VSP vocalized by a particular speaker. In some implementations, the method includes: selecting two or more related segments associated with a respective segment position across a concurrent segmentation of a plurality of vocalization instances of a VSP, wherein each of the plurality of vocalization instances of the VSP has vocal characteristics of a particular speaker; and, determining a respective segment template by determining a function of spectral features of the selected two or more related segments, wherein the function provides a stochastic characterization of how a particular portion of the VSP is vocalized by the particular speaker according to the vocal characteristics and the plurality of vocalization instances of the VSP.

In some implementations, each of the plurality of vocalization instances of the VSP associated with the concurrent segmentation includes the same number of segments ($N_S$) as the others. In some implementations, determining the function of spectral features includes determining one or more stochastic central characterization (SCC) values of the two or more related segments. In some implementations, a SCC value corresponds to an aggregated central spectral characterization of the segment position as a whole. In some implementations, a SCC value corresponds to an aggregated central spectral characterization of a portion of the segment position. In some implementation, each of one or more SCC values corresponds to a function of mel-frequency cepstrum coefficients (MFCCs) of each of the two or more related segments, such that each SCC value corresponds to a respective MFCC position within the segment position. In some implementations, a SCC value includes at least one of a mean value, mode value, a median value and a median range. In some implementations, determining the function of spectral features further comprises determining a deviation characterization value (DCV) for each corresponding SCC value determined for the segment position. In some implementations, a DCV includes one of a standard deviation value, a variance value, and a variance range.

In some implementations, the method also includes determining whether or not any of the two or more related segments associated with the segment position are statistical outliers with respect to the function of spectral features of the selected two or more related segments; and determining a confidence metric associated with the segment template in response to determining that at least one of the two or more related segments is a statistical outlier.

In some implementations, the method also includes generating a VSP segment mapping by: selecting a segment of one of the plurality of vocalization instances of the VSP associated with the respective segment position and the segment template; determining one or more timing characterization values for the selected segment; and determining a respective match score value of the selected segment to the segment template. In some implementations, the one or more timing characterization values include relative start and end time markers for the selected segment. In some implementations, the start and end time markers include time values that are relative to an earliest segment start time across the plurality of vocalization instances associated with the concurrent segmentation. In some implementations, determining the match score value includes determining one or more correlation values, that characterize the correlation of one or more values of the selected segment against a corresponding one or more values of the segment template. In some implementations, determining the match score value includes determining a score normalization coefficient value for the selected segment. In some implementations, the score normalization coefficient value includes a mean of the inverse Euclidean distances between spectral feature vectors in the selected segment to the segment template.

Some implementations include a system provided to generate one or more segment templates associated with a voiced sound pattern (VSP). In some implementations, the system includes: a related segment selection module configured to select two or more related segments associated with a respective segment position across a concurrent segmentation of a plurality of vocalization instances of a VSP, wherein each of the plurality of vocalization instances of the VSP has vocal characteristics of a particular speaker; and a stochastic segment characterization module configured to determine a respective segment template by determining a function of spectral features of the selected two or more related segments, wherein the function provides a stochastic characterization of how a particular portion of the VSP is vocalized by the particular speaker according to the vocal characteristics and the plurality of vocalization instances of the VSP.

In some implementations, the system also includes a VSP segment mapping module configured to: select a segment of one of the plurality of vocalization instances of the VSP associated with the respective segment position and the segment template; determine one or more timing characterization values for the selected segment; an determine a respective match score value of the selected segment to the segment template.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
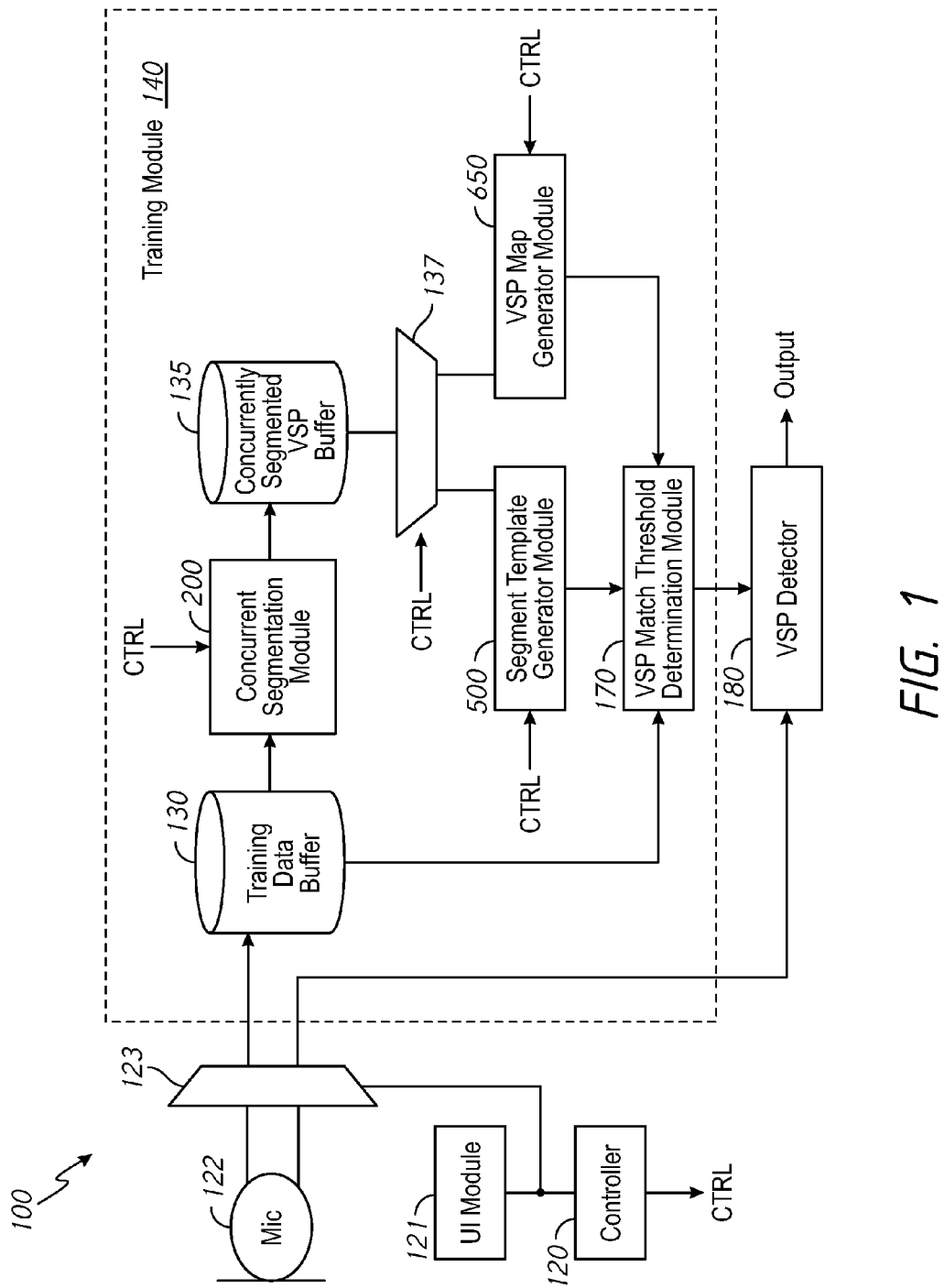
FIG. 1 is a block diagram of a VSP detection system configured to detect VSPs as vocalized by a particular speaker in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. And, well-known methods, components, and circuits have not been described in exhaustive detail so as not to unnecessarily obscure more pertinent aspects of the implementations described herein.

Previously known machine-listening technologies that enable detection and matching are computationally complex, use large memory allocations, and yet still remain functionally limited and highly inaccurate. As noted above, previously known technologies are limited to using a single vocalization instance of a VSP in a training process, because the processes cannot jointly use multiple vocalization instances without excessive multiplicative increases in computational complexity and memory demand. However, a single vocalization instance does not provide a sufficient amount of information to reliably train a VSP detection system—especially when successful VSP detection is intended to be limited to vocalizations of a particular speaker (i.e., speaker dependent detection).

By contrast, various implementations disclosed herein include a training module configured to produce a set of segment templates from a concurrent segmentation of multiple similar instances of a VSP vocalized by a particular speaker, who is identifiable by a corresponding set of vocal characteristics. In some implementations, within the concurrent segmentation, each of the instances of the VSP is divided into the same number of segments ($N_S$). Having the same number of segments ($N_S$) for each VSP vocalization instances enables the generation and utilization of a common set of segment templates for the VSP, which reduces memory allocation, processor usage, and ultimately power consumption. Moreover, information produced from multiple instances of a VSP vocalized by a particular speaker characterizes how the particular speaker vocalizes the VSP and how those vocalizations may vary between instances. Each segment template provides a stochastic characterization of how each of one or more portions of a VSP is vocalized by the particular speaker in accordance with the corresponding set of vocal characteristics. Additionally, in various implementations, the training module includes systems, methods and/or devices configured to produce a set of VSP segment maps that each provide a quantitative characterization of how a respective segment of the plurality of vocalization instances varies in relation to a corresponding one of a set of segment templates.

FIG. 1 is a block diagram of a VSP detection system 100 provided to detect a VSP as vocalized by a particular speaker in accordance with some implementations. In various implementations, the VSP detection system 100 is included in a device or system operable for one or more machine-listening applications, such as a computer, a laptop computer, a tablet device, a mobile phone, a smartphone, a wearable (e.g., a smart watch) a gaming device, and a hearing aid. So while pertinent features are illustrated, those of ordinary skill in the art will appreciate from the present disclosure that various other features have not been illustrated for the sake of brevity and so as not to obscure more pertinent aspects of the implementations disclosed herein. Also, those of ordinary skill in the art will appreciate from the present disclosure that the functions of the modules described below can be combined into one or more modules and/or further sub-divided into additional sub-modules; and, that the modules described below are provided as merely one example configuration of the various aspects and functions described herein.

To that end, as a non-limiting example, in some implementations, the VSP detection system 100 includes a microphone 122, a multiplexer (MUX) 123, a user interface (UI) module 121, a controller 120, a VSP detector module 180, and a training module 140. As shown in FIG. 1, the microphone 122 is selectively connectable to both the training module 140 and the VSP detector module 180 through the MUX 123. In some implementations, the MUX 123 is used to coordinate switching between a training mode and a detection mode. In the training mode, the MUX 123 is used to couple the microphone 122 to the training module 140. In a detection mode, the MUX 123 is used to couple the microphone 122 to the VSP detector module 180. Mode-based selection and switching are enabled by the controller 120. In some implementations, the training module 140 is provided separately.

In some implementations, mode selection and/or switching is responsive to a user input received through the UI module 121. In some implementations, the UI module 121 includes one or more processors, one or more types of memory, a display and/or other user interface components such as a keyboard, a touch screen display, a mouse, a track-pad, a digital camera and/or any number of supplemental devices to add functionality.

In some implementations, the microphone 122 (e.g., one or more audio sensors) is provided to receive and convert sound into an electronic signal that can be stored in a non-transitory memory, and which is referred to as audible signal data herein. In many situations, the audible signal is captured from an adverse acoustic environment, and thus likely includes ambient noise, interfering sounds and background chatter in addition to the target voice of interest. In many applications, a received audible signal is an ongoing or continuous time series. In turn, in some implementations, a times series conversion module (e.g., windowing module 211 shown in FIG. 2) is configured to generate two or more temporal frames of audible signal data from a stream of audible signal data. Each temporal frame of the audible signal data includes a temporal portion of the audible signal received by the microphone 122.

In some implementations, the VSP detector module 180 uses at least one detection threshold metric (e.g., speaker dependent VSP feature characterizations), provided by the training module 140, for detecting and matching the VSP as vocalized by the particular speaker. The at least one detection threshold metric is used to score how well subsequently received portions of an audible signal match extracted speaker dependent VSP features that have been extracted from multiple instances of the VSP during a training mode. In other words, the training module 140 allows a user to provide multiple examples of a VSP that are used to enable the VSP detection module 180 with a more reliable set of one or more detection threshold metrics.

In some implementations, the training module 140 includes a training data buffer 130, a concurrent segmentation module 200, a concurrently segmented VSP buffer 135, an optional MUX 137, a segment template generator module 500, a VSP map generator module 650, and a VSP match (i.e., detection) threshold determination module 170.

In some implementations, the training data buffer 130 is used to store and receive a number of similar vocalization instances of a VSP provided by a user—who in some implementations is first authenticated. As would be understood by those of ordinary skill in the art, two separate words or phrases (e.g., "apple" and "orange") are not considered similar vocalization instances of the same VSP because they do not have at least loosely matching spectral components. However, two separate utterances of the same word by the same speaker can be considered similar vocalization instances, when the two separate utterances are not intentionally spoken with exceeding amounts of variation. In such cases, even accounting for natural variation is a speaker's voice, the two separate utterances of the same word have at least loosely matching spectral components that are a function of the speaker's vocalization system.

As described below with reference to FIG. 2, the concurrent segmentation module 200 is configured to jointly and simultaneously segment multiple similar vocalization instances of the VSP in order to produce a concurrent segmentation applicable across all of the multiple similar vocalization instances of the VSP. In other words, each of the multiple similar vocalization instances of the VSP is segmented into the same number of segments ($N_S$) as the other vocalization instances. In accordance with the concurrent segmentation, corresponding segments from two or more respective vocalization instances are aligned and mapped to one another based on matched spectral features, and not necessarily based on specific and matching temporal points. The concurrent segmentation module 200 then stores the concurrent segmentation of the multiple similar vocalization instances of the VSP in the concurrently segmented VSP buffer 135.

As described in greater detail below with reference to FIGS. 4-7, in some implementations, the segment template generator module 500 and the VSP map generator module 650 are configured to produce additional speaker dependent VSP characterizations using the concurrent segmentation stored in the concurrently segmented VSP buffer 135. In turn, the VSP match threshold determination module 170 utilizes the VSP characterizations provided by the segment template generator module 500 and the VSP map generator module 650, as well as additional raw training data (e.g., a relatively unprocessed VSP vocalization instance) from the training data buffer 130, in order to produce a more reliable set of one or more detection threshold metrics suitable for the VSP detection module 180.

The controller 120 is coupled to each of the aforementioned in order to coordinate the operation of the VSP detection system 100. More specifically, the controller 120 is connected to provide the training module 140 with control commands and/or instructions that direct the training module 140 to produce one or more detection threshold metrics based on a concurrent segmentation of multiple instances of a VSP as vocalized by a particular speaker. The controller 120 is also coupled to the MUX 123 in order to effectuate mode-based selection and switching, as described above. The VSP detector module 180 is configured to use keyword characterizations to score how well subsequently received portions of an audible signal match the speaker dependent keyword characterizations that are used as the basis of one or more detection (and/or matching) threshold metrics (provided by the training module 140).

Figure 2:
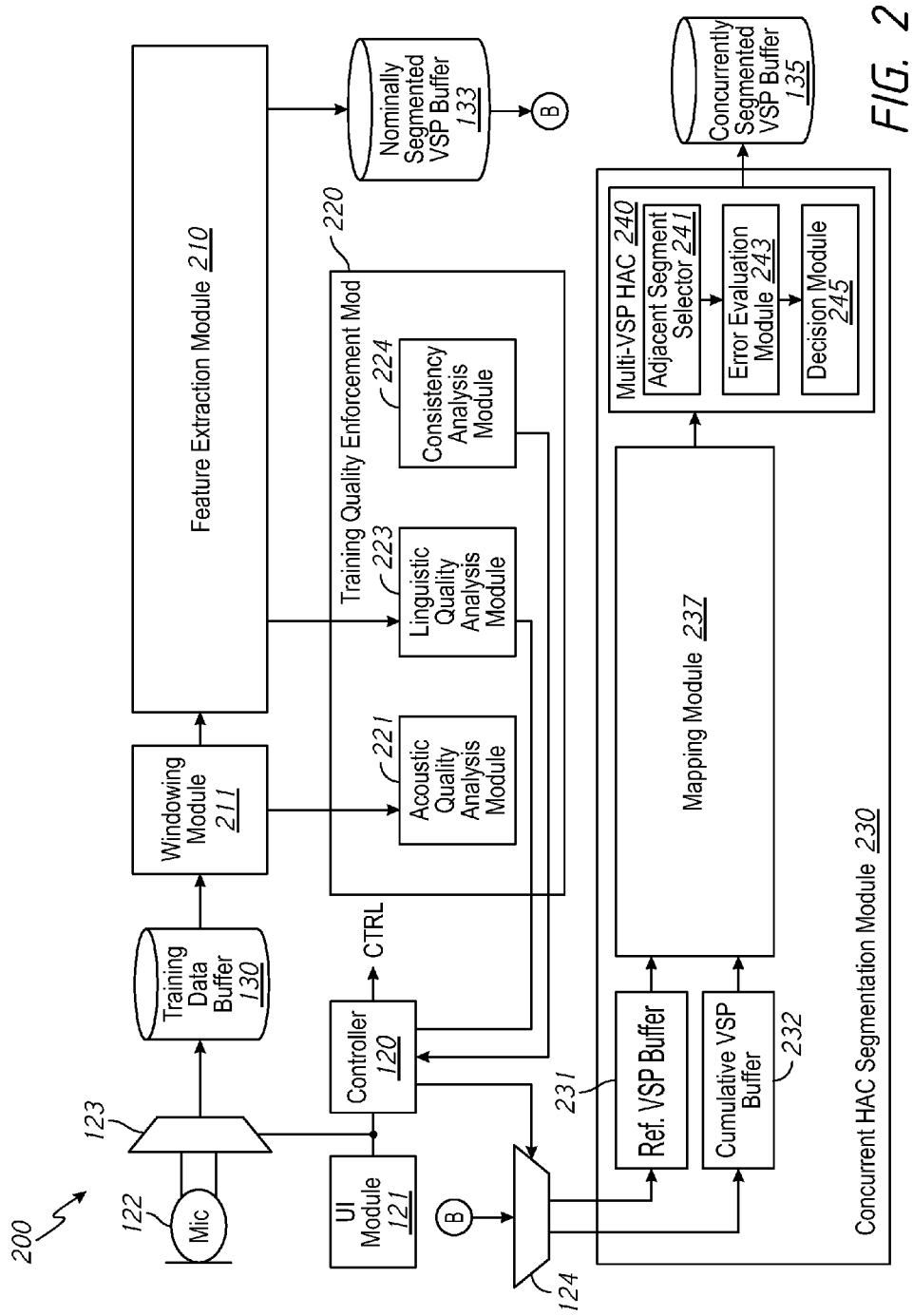
FIG. 2 is a block diagram of a segmentation module configured to determine a concurrent segmentation of multiple instances of a VSP in accordance with some implementations.

FIG. 2 is a block diagram of the concurrent segmentation module 200 included in the VSP detection system 100 of FIG. 1 in accordance with some implementations. Portions of FIG. 2 are adapted from FIG. 1, and so elements common to each include common reference numbers, and only the differences between FIGS. 1 and 2 are described herein for the sake of brevity. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the concurrent segmentation module 200 includes a windowing module 211, a feature extraction module 210, a training quality enforcement module 220, and a concurrent HAC segmentation module 230. The concurrent segmentation module 200 also includes a training data buffer 130, a nominally segmented VSP buffer 133, a reference VSP buffer 231, a cumulative VSP buffer 232, and a concurrently segmented VSP buffer 135.

In some implementations, the windowing module 211 is configured to mark and separate a set of one or more temporal frames of each of the plurality of vocalization instances (i.e., audible signal data) of the VSP for frame boundary times $t_1, t_2, \ldots, t_n$. In some implementations, each temporal frame is optionally conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of audible signal data. Additionally and/or alternatively, in some implementations, the windowing module 211 configured to retrieve the audible signal data from a non-transitory memory (e.g., training data buffer 130). Additionally and/or alternatively, in some implementations, pre-filtering includes filtering the received audible signal using a low-noise amplifier (LNA) in order to substantially set a noise floor. In some implementations, a pre-filtering LNA is arranged between the microphone 122 and the MUX 123. Those of ordinary skill in the art will appreciate that numerous other pre-filtering techniques may be applied to the received audible signal data, and those discussed are merely examples of numerous pre-filtering options available.

In some implementations, a MUX (not shown) is provided between the windowing module 211 and the feature extraction module 210. The MUX is provided in order to regulate and/or operation of the feature extraction module 210 while training data is assessed for acoustic acceptability by the training quality enforcement module. In some implementations, until a sufficient amount of acoustically acceptable training data is obtained, the controller 120 prevents transfer of training data from the windowing module 211 to the feature extraction module 210 by sending a control signal to the MUX.

In some implementations, the feature extraction module 210 is configured to identify and extract spectral features from a frequency domain representation for each of the one or more temporal frames in each respective set corresponding to the plurality of vocalization instances of the VSP. In some implementations, the feature extraction module 210 is configured to select 19 MFCCs per frame for each of the plurality of vocalization instances of the VSP. In some implementations, the feature extraction module 210 is configured to assess and obtain the characteristics of spectral features (i.e., a feature characterization set) in each of the frequency domain representations of the one or more frames of the audible signal data. In various implementations, a feature characterization set includes any of a number and/or combination of signal processing features, such as spectra, cepstra, mel-scaled cepstra, pitch, a signal-to-noise ratio (SNR), a voice strength estimate, and a voice period variance estimate. In some implementations, for example, the feature extraction module 210 includes one or more sub-modules that are configured to analyze the frames in order to obtain spectral feature characterization data. In some implementations, selected frame-wise MFCCs are stored in the nominally segmented VSP buffer 133 and indexed by respective vocalization instance identifiers corresponding to the plurality of vocalization instances of the VSP.

Additionally and/or alternatively, for example, in various implementations, feature extraction module 210 includes a cepstrum analysis sub-module, a pitch estimation sub-module, a mel-frequency cepstrum coefficients analysis sub-module, a SNR estimation sub-module, a voice strength estimation sub-module, and a voice period variance estimation sub-module. Those of ordinary skill in the art will appreciate from the present disclosure that the functions of the aforementioned sub-modules can be combined into one or more sub-modules and/or further sub-divided into additional sub-modules and/or included in portions of the training quality enforcement module 200; and, that the aforementioned sub-modules are provided as merely one example configuration of the various aspects and functions described herein.

In some implementations, the cepstrum analysis sub-module is configured to determine the Fourier Transform (FT) of the logarithm of a frequency domain representation of a temporal frame. In some implementations, the pitch estimation sub-module is configured to provide a pitch estimate of voice activity in an audible signal. As known to those of ordinary skill in the art, pitch is generally an estimation of a dominant frequency characterizing a corresponding series of glottal pulses associated with voiced sounds. As such, the pitch estimation sub-module is configured to identify the presence of regularly-spaced transients generally corresponding to glottal pulses characteristic of voiced speech. In some implementations, the transients are identified by relative amplitude and relative spacing. In some implementations, the mel-frequency cepstrum coefficients (MFCCs) analysis sub-module is configured to provide a representation of the short-term power spectrum of a frequency domain representation of a temporal frame. Typically, the short-term power spectrum is based on a linear cosine transform on a log power spectrum on a non-linear mel scale of frequency. In some implementations, the SNR estimation sub-module is configured to estimate the signal-to-noise ratio in one or more of the frequency domain representations of the temporal frames. In some implementations, the voice strength estimation sub-module is configured to provide an indicator of the relative strength of the target or dominant voice signal in a frame. In some implementations, the relative strength is measured by the number of detected glottal pulses, which are weighted by respective correlation coefficients. In some implementations, the relative strength indicator includes the highest detected amplitude of the smoothed inter-peak interval accumulation produced by an accumulator function. In some implementations, the voice period variance estimation sub-module is configured to estimate the pitch variance in one or more of the frequency domain representations of the temporal frames. In other words, the voice period variance estimator provides an indicator for each sub-band that indicates how far the period detected in a sub-band is from the dominant voice period P. In some implementations the variance indicator for a particular sub-band is determined by keeping track of a period estimate derived from the glottal pulses detected in that particular sub-band, and comparing the respective pitch estimate with the dominant voice period P.

In some implementations, the training quality enforcement module 220 includes an acoustic quality analysis module 221, a linguistic quality analysis module 223, and consistency analysis module 224. In some implementations, the acoustic quality analysis module 221 is configured to determine acoustic acceptability (e.g., amplitude, SNR, completeness, length, etc.). In some implementations, the linguistic quality analysis module 223 is configured to determine linguistic acceptability (e.g., spectrum shape, frequency content, spectral variation, etc.). In some implementations, the consistency analysis module 224 is configured to determine whether or not a function of the variation between DTW MFCCs and the MFCCs of the reference VSP vocalization instance breaches a threshold performance metric.

In some implementations, the concurrent HAC segmentation module 230 includes a mapping module 237 and a multi-VSP HAC module 240. The mapping module 237 is configured to determine respective frame-wise spectral feature distances between each of the cumulative VSP vocalization instances, stored in the cumulative VSP buffer 232, and the reference VSP vocalization instance, stored in the reference VSP buffer 231. Subsequently, the mapping module 237 is configured to perform dynamic time warping (DTW) on the distance matrix, and then use the DTW result to map spectral features of the cumulative VSP vocalization instances to spectral features of the VSP vocalization instance in order to produce a segment mapping. In some implementations, the multi-VSP HAC module 240 is configured to perform the modified HAC process, in accordance with various implementations, in order to adjust the segmentation of the plurality of vocalization instances of the VSP.

Figure 3:
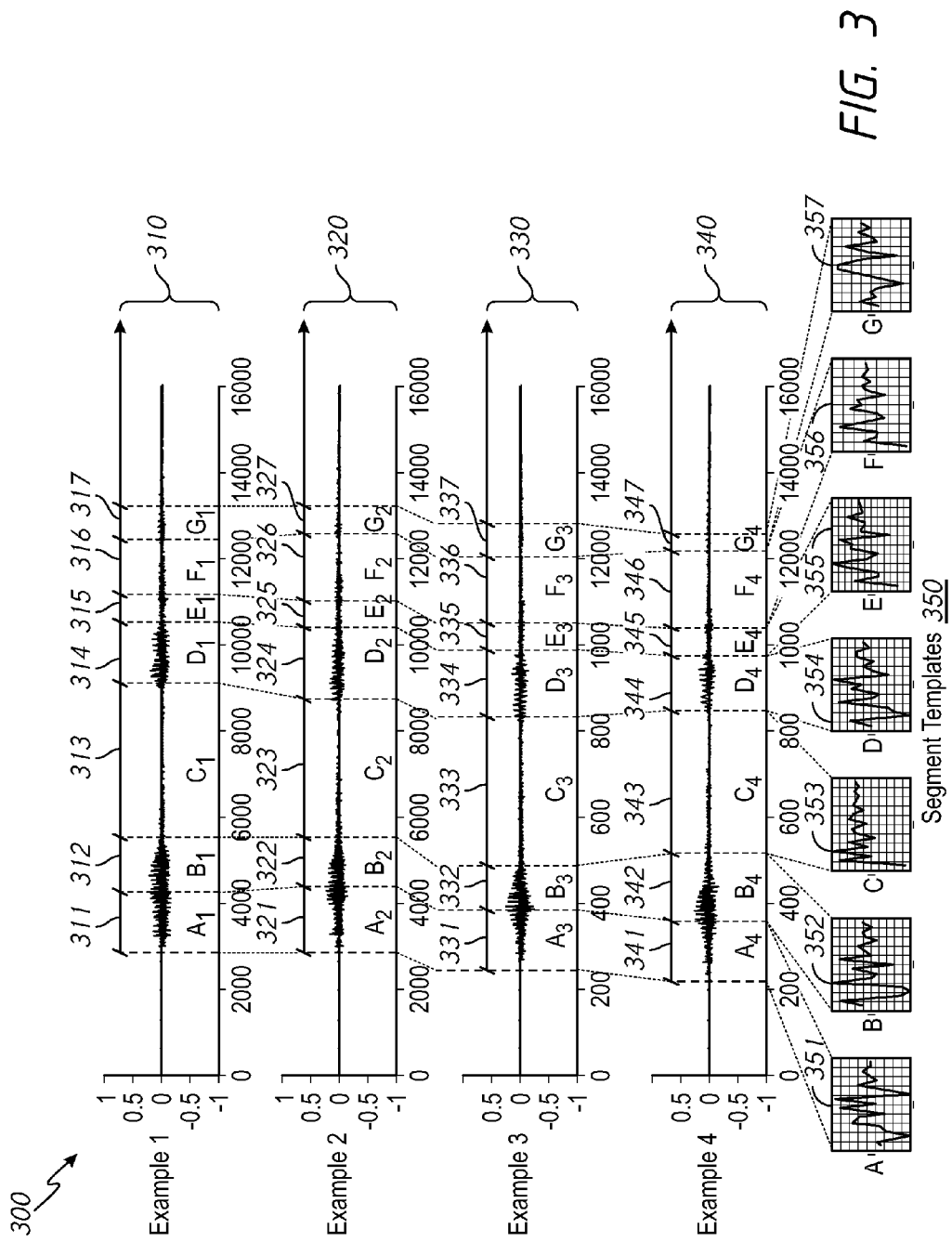
FIG. 3 is a performance diagram illustrating an example of a concurrent segmentation of multiple instances of a VSP in accordance with some implementations.

As an example, FIG. 3 is a performance diagram illustrating an example of a concurrent segmentation 300 of multiple instances of a VSP in accordance with some implementations—generated by the process described above with reference to FIG. 2. The concurrent segmentation 300 includes a plurality of vocalization instances of the VSP that have been jointed segmented. Each vocalization instances of the VSP in the concurrent segmentation 300 includes the same number of segments ($N_S$) as the other vocalization instances. However, in accordance with the concurrent segmentation 300, corresponding segments from two or more respective vocalization instances are aligned and mapped to one another based on matched spectral features, and not necessarily based on specific and matching temporal points or time markers.

As shown in the example provided in FIG. 3, the plurality of vocalization instances of the VSP includes four vocalization instances 310, 320, 330, 340. While four vocalization instances are illustrated in FIG. 3, those of ordinary skill in the art will appreciate from the present disclosure that any number of vocalization instances can be utilized in various implementations. In accordance with the process described above with reference to FIG. 2, each vocalization instance 310, 320, 330, 340 has been jointly segmented with the others into seven segments ($A_N$ to $G_N$). As such, the first vocalization instance 310 includes seven segments 311, 312, 313, 314, 315, 316, 317 ($A_1$, $B_1$, $C_1$, $D_1$, $E_1$, $F_1$, $U_1$). The second vocalization instance 320 includes seven segments 321, 322, 323, 324, 325, 326, 327 ($A_2$, $B_2$, $C_2$, $D_2$, $E_2$, $F_2$, $U_2$). The third vocalization instance 330 includes seven segments 331, 332, 333, 334, 335, 336, 337 ($A_3$, $B_3$, $C_3$, $D_3$, $E_3$, $F_3$, $G_3$). The fourth vocalization instance 340 includes seven segments 341, 342, 343, 344, 345, 346, 347 ($A_4$, $B_4$, $C_4$, $D_4$, $E_4$, $F_4$, $G_4$). In other words, the vocalization instances of the VSP have been segmented to include the same number of segments ($N_S$) as one another in accordance with the concurrent segmentations.

In some implementations, having the same number of segments ($N_S$) for each VSP enables the generation and utilization of a common set of segment templates 350 for the VSP, which reduces memory allocation, processor usage, and ultimately power consumption. Segment template A (351) is a function of the corresponding first segments ($A_n$) from each of the vocalization instances 310, 320, 330, 340. Segment template B (352) is a function of the corresponding second segments ($B_n$) from each of the vocalization instances 310, 320, 330, 340. Segment template C (353) is a function of the corresponding third segments ($C_n$) from each of the vocalization instances 310, 320, 330, 340. Segment template D (354) is a function of the corresponding fourth segments ($D_n$) from each of the vocalization instances 310, 320, 330, 340. Segment template E (355) is a function of the corresponding fifth segments ($E_n$) from each of the vocalization instances 310, 320, 330, 340. Segment template F (656) is a function of the corresponding sixth segments ($F_n$) from each of the vocalization instances 310, 320, 330, 340. Segment template G (357) is a function of the corresponding seventh segments ($G_n$) from each of the vocalization instances 310, 320, 330, 340.

Figure 4:
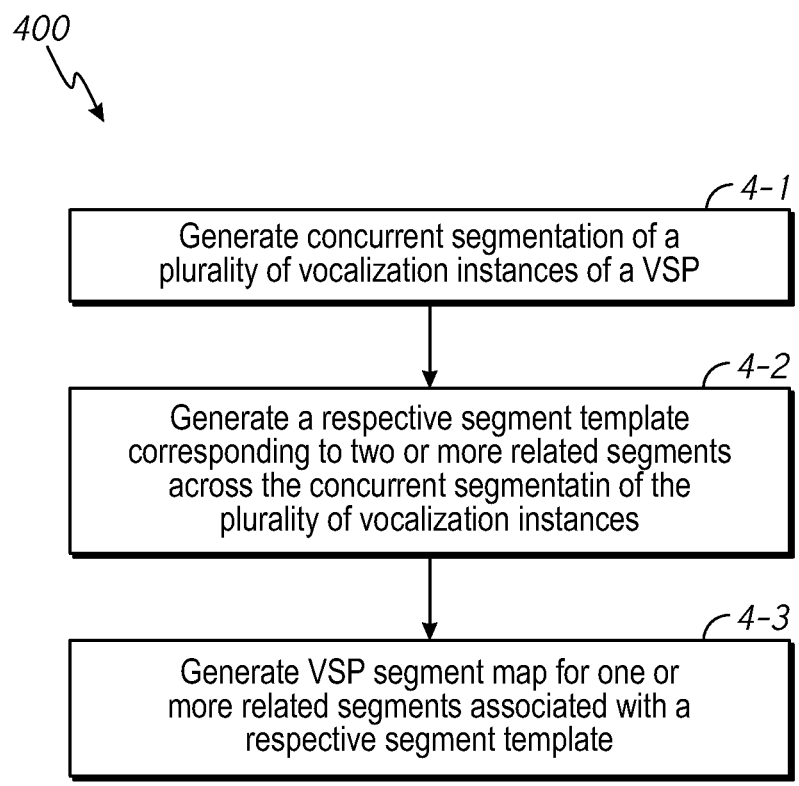
FIG. 4 is a flowchart representation of a method of generating segment templates and VSP segment mappings in accordance with some implementations.

FIG. 4 is a flowchart representation of a method 400 of generating segment templates and VSP segment mappings in accordance with some implementations. In some implementations, with continued reference to FIG. 1, the method 400 is performed by the segment template generator module 500 and VSP map generator module 650 in coordination with the controller 120 and concurrent segmentation module 200. Briefly, the method 400 includes generating at least one segment template based on a concurrent segmentation of multiple vocalization instances of a VSP; and, subsequently generating at least one VSP segment mapping between a segment of a vocalization instance and a respective segment template.

As represented by block 4-1, the method 400 includes obtaining a concurrent segmentation of a plurality of vocalization instances of a VSP. For example, with reference to FIG. 1, the segment template generator module 500 and the VSP map generator module 650 receive and/or retrieve a concurrent segmentation from the concurrently segmented VSP buffer 135. As shown in FIG. 1, the concurrently segmented VSP buffer 135 is selectively connectable to both the segment template generator module 500 and the VSP map generator module 650 through the MUX 137. In some implementations, the MUX 137 is used to coordinate switching between a segment template generation mode and a VSP segment mapping mode. In the segment template generation mode, the MUX 137 is used to couple the concurrently segmented VSP buffer 135 to the segment template generator module 500. In the VSP segment mapping mode, the MUX 137 is used to couple the concurrently segmented VSP buffer 135 to the VSP map generator module 650. Mode-based selection and switching are enabled by the controller 120 by way of a control signal to the MUX 137.

As represented by block 4-2, the method 400 includes generating a segment template based on two or more related segments across the concurrent segmentation of the plurality of vocalization instances. In accordance with various implementations, a segment template provides a stochastic characterization of how a particular portion of a VSP is vocalized by the particular speaker according to a corresponding set of vocal characteristics and multiple vocalization instances of the VSP by the particular speaker. For example, with reference to FIGS. 1 and 3, the segment template generator module 500 uses the respective third segments $C_1$, $C_2$, $C_3$, $C_4$ from the corresponding vocalization instances 310, 320, 330, 340 in order to generate segment template C (353). In other words, segment template C (353) is a function of the corresponding third segments ($C_n$) from each of the vocalization instances 310, 320, 330, 340. An example method of generating segment templates, in accordance with various implementations, is described below with reference to FIGS. 5 and 6.

As represented by block 4-3, the method 400 includes generating at least one VSP segment mapping between a segment of a vocalization instance and a respective segment template. In accordance with various implementations, each VSP segment map provides a quantitative characterization of how respective segments of one of the plurality of vocalization instances varies in relation to a corresponding set of segment templates. For example, with reference to FIGS. 1 and 3, the VSP map generator module 650 generates a segment mapping between each of the seven segments 321, 322, 323, 324, 325, 326, 327 ($A_2$, $B_2$, $C_2$, $D_2$, $E_2$, $F_2$, $G_2$) of the second vocalization instance 320 and a corresponding one of the seven segment templates A, B, C, D, E, F, G (351, 352, 353, 354, 355, 356, 357) in order to produce a VSP segment map for the second vocalization instance 320. More specifically, in one example, a mapping is generated between the first segment 321 ($A_2$) of the second vocalization instance 320 and the corresponding segment template A (351) (and so on for the other segments). An example method of generating VSP segment mappings in accordance with various implementations is described below with reference to FIGS. 5 and 7.

Figure 5:
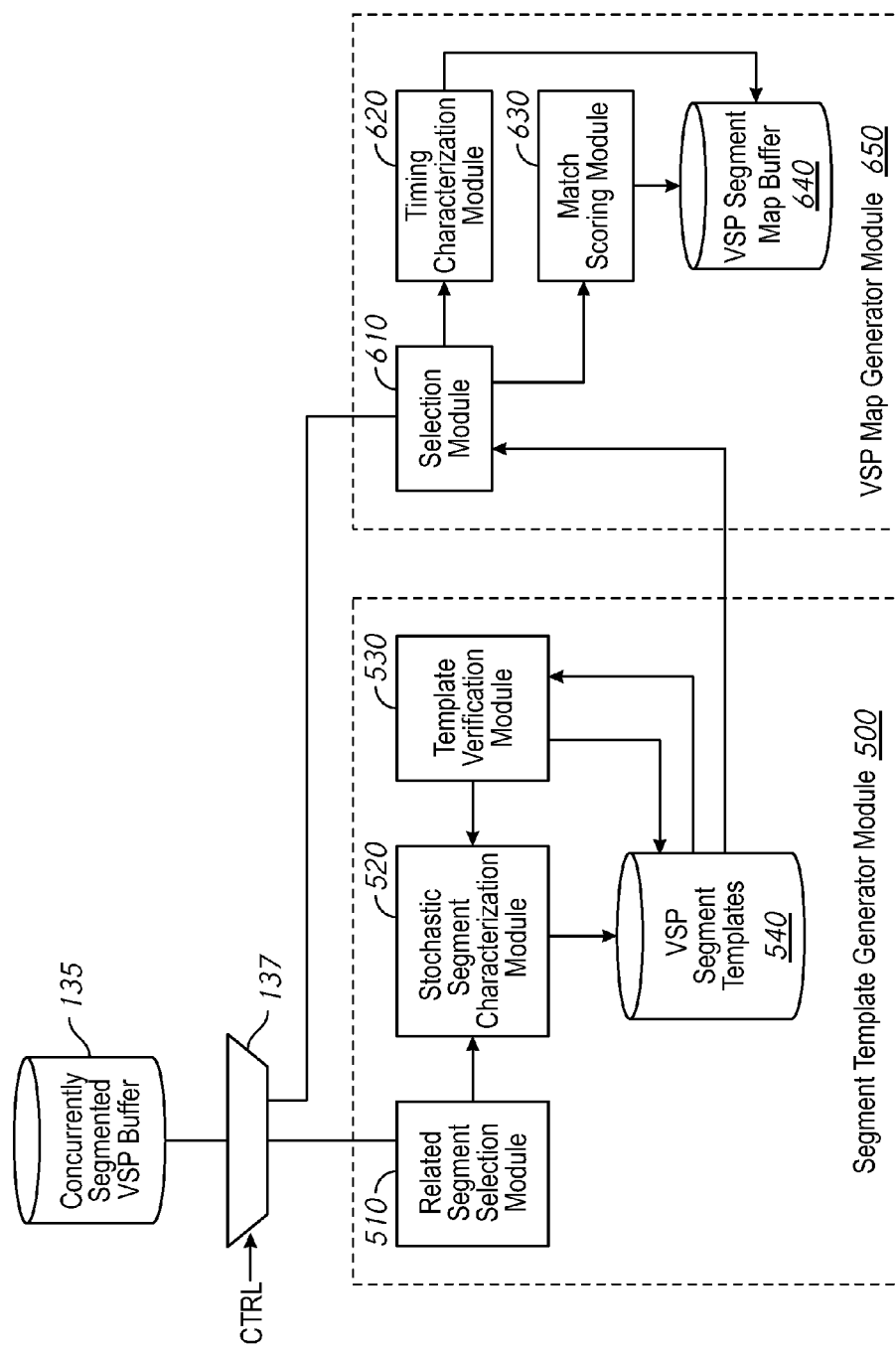
FIG. 5 is a block diagram of a segment template generation module in combination with a segment mapping module in accordance with some implementations.

FIG. 5 is a more detailed block diagram of the segment template generation module 500 together with the VSP map generator module 650 in accordance with some implementations. Portions of FIG. 5 are adapted from FIG. 1, and so elements common to each include common reference numbers, and only the differences between FIGS. 1 and 5 are described herein for the sake of brevity. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the segment template generation module 500 includes a related segment selection module 510, a stochastic segment characterization module 520, an optional template verification module 530, and a VSP segment templates buffer 540. As also shown in FIG. 5, in some implementations, the VSP map generator module 650 includes a selection module 610, a timing characterization module 620, a match scoring module 630 and a VSP segment map buffer 640.

Referring to the segment template generation module 500, the related segment selection module 510 is configured to select two or more related segments from across a concurrent segmentation of multiple vocalization instances of a VSP. Related segments are used to generate a respective segment template. For example, with additional reference to FIG. 3, the related segment selection module 510 selects the respective third segments $C_1$, $C_2$, $C_3$, $C_4$ from the corresponding vocalization instances 310, 320, 330, 340 in order to generate segment template C (353). The related segment selection module 510 similarly selects related segments for the other segment templates A, B, D, E, F, G (351, 352, 354, 355, 356, 357). The stochastic segment characterization module 520 is configured to generate a respective segment template by determining a stochastic characterization of the combination of the selected related segments. A segment template provides a stochastic characterization of how a particular portion of a VSP is vocalized by the particular speaker according to a corresponding set of vocal characteristics and multiple vocalization instances of the VSP by the particular speaker. The stochastic segment characterization module 520 stores generated segment templates in the VSP segment template buffer 540. In some implementations, the template verification module 530 is configured to assess and characterize the quality of generated segment templates. In some implementations, segment template quality is a function of a confidence metric determined for a segment template, as described in greater detail below with reference to FIG. 6.

Referring to the VSP map generator module 650, the selection module 610, is configured to select a segment from a vocalization instance and a corresponding segment template in order to enable mapping between the selected segment and the corresponding segment template. For example, with reference to FIG. 3, a mapping is generated between the first segment 321 ($A_2$) of the second vocalization instance 320 and the corresponding segment template A (351). A VSP segment map for a vocalization instance includes mappings between respective segments and corresponding segment templates. An example of a complete VSP segment map for the second vocalization instance 320 is shown in Table 1.0 below. Similar VSP segment maps could be produced for the other vocalization instances 310, 330, 340, but are not shown herein for the sake of brevity.

TABLE 1.0

VSP Segment Map for the Second Vocalization Instance 320

| SEGMENT | Start Frame | End Frame | Norm. Coeff |
|---|---|---|---|
| $A_2$ | 35 | 25 | 356.5761635 |
| $B_2$ | 25 | 22 | 851.4795195 |
| $C_2$ | 22 | 19 | 549.7918519 |
| $D_2$ | 19 | 13 | 811.9623005 |
| $E_2$ | 13 | 6 | 961.7435665 |
| $F_2$ | 6 | 2 | 527.6092704 |
| $G_2$ | 2 | 0 | 889.6925914 |

In some implementations, the timing characterization module 620 is configured to determine the relative start and end times (i.e., time markers) for each of two or more segments of a vocalization instance. For example, in some implementations, with reference to Table 1.0 above, the start and end time markers are provided as time values that are relative to an earliest segment start time across all vocalization instances associated with a concurrent segmentation. In some implementations, the match scoring module 630 is configured to determine a respective match score value that quantitatively characterizes how closely a segment matches a corresponding segment template. In various implementations, a VSP segment map for a vocalization instance includes segment timing characterizations and match score values for each segment of the vocalization instance. VSP segment maps are stored in the VSP segment map buffer 640.

Figure 6:
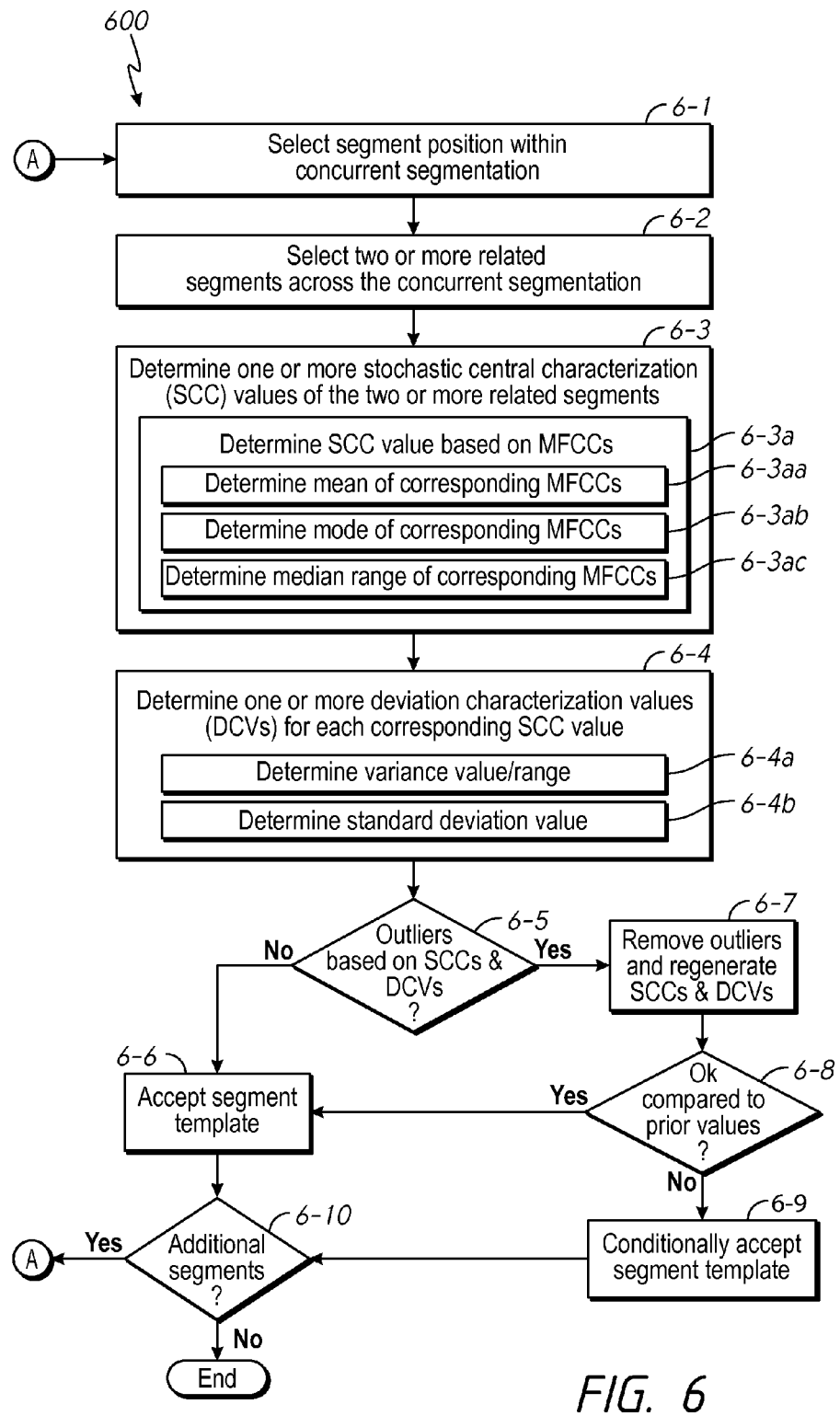
FIG. 6 is a flowchart representation of a method of generating segment templates associated with multiple instances of a VSP according to some implementations.

FIG. 6 is a flowchart representation of a method 600 of generating segment templates associated with multiple instances of a VSP according to some implementations. With continued reference to Figures 1 and 5, in some implementations the method 600 is performed by the segment template generator module 500. Briefly, the method 600 includes generating a respective segment template for each segment position of a concurrent segmentation of multiple vocalization instances of a VSP, such that each segment template provides a stochastic characterization of how a particular portion of a VSP is vocalized by the particular speaker according to a corresponding set of vocal characteristics and multiple vocalization instances of the VSP by the particular speaker.

As represented by block 6-1, the method 600 includes selecting a segment position within the concurrent segmentation in order to produce a respective segment template. For example, with reference to FIGS. 1, 3 and 5, the related segment selection module 510 in coordination with the controller 120 selects the first segment position ($A_n$) across the concurrent segmentation in order to produce the first segment template A (351). As represented by block 6-2, the method 600 includes selecting two or more related segments across the concurrent segmentation associated with the selected segment position. For example, with reference to FIGS. 3 and 5, the related segment selection module 510 selects the respective first segments $A_1$, $A_2$, $A_3$, $A_4$ from the corresponding vocalization instances 310, 320, 330, 340 in order to generate segment template A (351).

As represented by block 6-3, the method 600 includes determining one or more stochastic central characterization (SCC) values of the two or more related segments. For example, with reference to FIG. 5, the stochastic segment characterization module 520 determines one or more SCC values for the selected segment position based on two or more related segments. In some implementations, as represented by block 6-3a, one or more SCC values are determined as a function of mel-frequency cepstrum coefficients (MFCCs) of each of the two or more related segments. In some implementations, a SCC value corresponds to an aggregated central spectral characterization of the whole segment position or a portion of the segment position. In some implementations, each SCC value corresponds to a MFCC position within a segment position. For example, with additional reference to FIG. 2, the feature extraction module 210 is configured to select 19 MFCCs per segment for each of the plurality of vocalization instances of a VSP. Accordingly, in some such implementations, 19 corresponding SCC values characterize the two or more related segments of a selected segment position. In some implementations, as represented by 6-3aa, determining a SCC value includes determining a mean of corresponding MFCCs (or other spectral characterization features). In some implementations, as represented by 6-3ab, determining a SCC value includes determining a mode of corresponding MFCCs (or other spectral characterization features). In some implementations, as represented by 6-3ac, determining a SCC value includes determining a median range of corresponding MFCCs (or other spectral characterization features).

As represented by block 6-4, the method 600 includes determining a deviation characterization value (DCV) for each corresponding SCC value determined for the segment position. For example, with reference to FIG. 5, the stochastic segment characterization module 520 determines one or more respective DCVs corresponding to the one or more previously determined SCC values. In some implementations, as represented by block 6-4a, a DCV includes a variance value and/or variance range. In some implementations, as represented by block 6-4b, a DCV includes a standard deviation value.

As represented by block 6-5, the method 600 includes determining whether or not any of the two or more related segments associated with the selected segment position are statistical outliers with respect to the SCC values and the DCVs. For example, with reference to FIG. 5, the template verification module 530 compares each of the two or more related segments to the initially determined SCC values and the DCVs in order to identify outliers. If there are no outliers ("No" path from block 6-5), as represented by block 6-6, the method 600 includes accepting the one or more SCC values and the one or more DCVs as portions of the segment template for the selected segment position. On the other hand, if there is at least one outlier ("Yes" path from block 6-5), as represented by block 6-7, the method 600 includes removing the at least one outlier from a redetermination of the SCC values and the DCVs in order to assess the impact of the at least one outlier on the initially determined SCC values and the DCVs.

As represented by block 6-8, the method 600 includes determining whether or not the subsequently determined SCC values and DCVs are substantially different from the initially determined SCC values and the DCVs. For example, with reference to FIG. 5, the template verification module 530 compares the initially determined SCC values and the DCVs to the subsequently determined SCC values and the DCVs. If the sets of values are not substantially different (e.g., within an acceptable threshold) and thus compare favorably ("Yes" path from block 6-8), as represented by block 6-6, the method 600 includes accepting the initially determined one or more SCC values and the one or more DCVs as portions of the segment template for the selected segment position. On the other hand, if the sets of values do not compare favorably ("No" path from block 6-8), as represented by block 6-9, the method 600 includes conditionally accepting the segment template in combination with a confidence metric (e.g., a quality-indicative value or a flag). In some implementations, the confidence metric provides an indicator of the degree to which the two sets of SCC values and DCVs diverge from one another in order to provide a detection process with additional information about the segment template and the possibly confidence associated with a detection result.

As represented by block 6-10, the method 600 includes determining if there are additional segment positions associated with the concurrent segmentation that can be used to produce a segment template. If an additional segment position has yet to be considered ("Yes" path from block 6-10), the method circles back to the portion of the method represented by block 6-1. On the other hand, if all of the segment positions have been considered ("No" path from block 6-10), the current run of the method ends.

Figure 7:
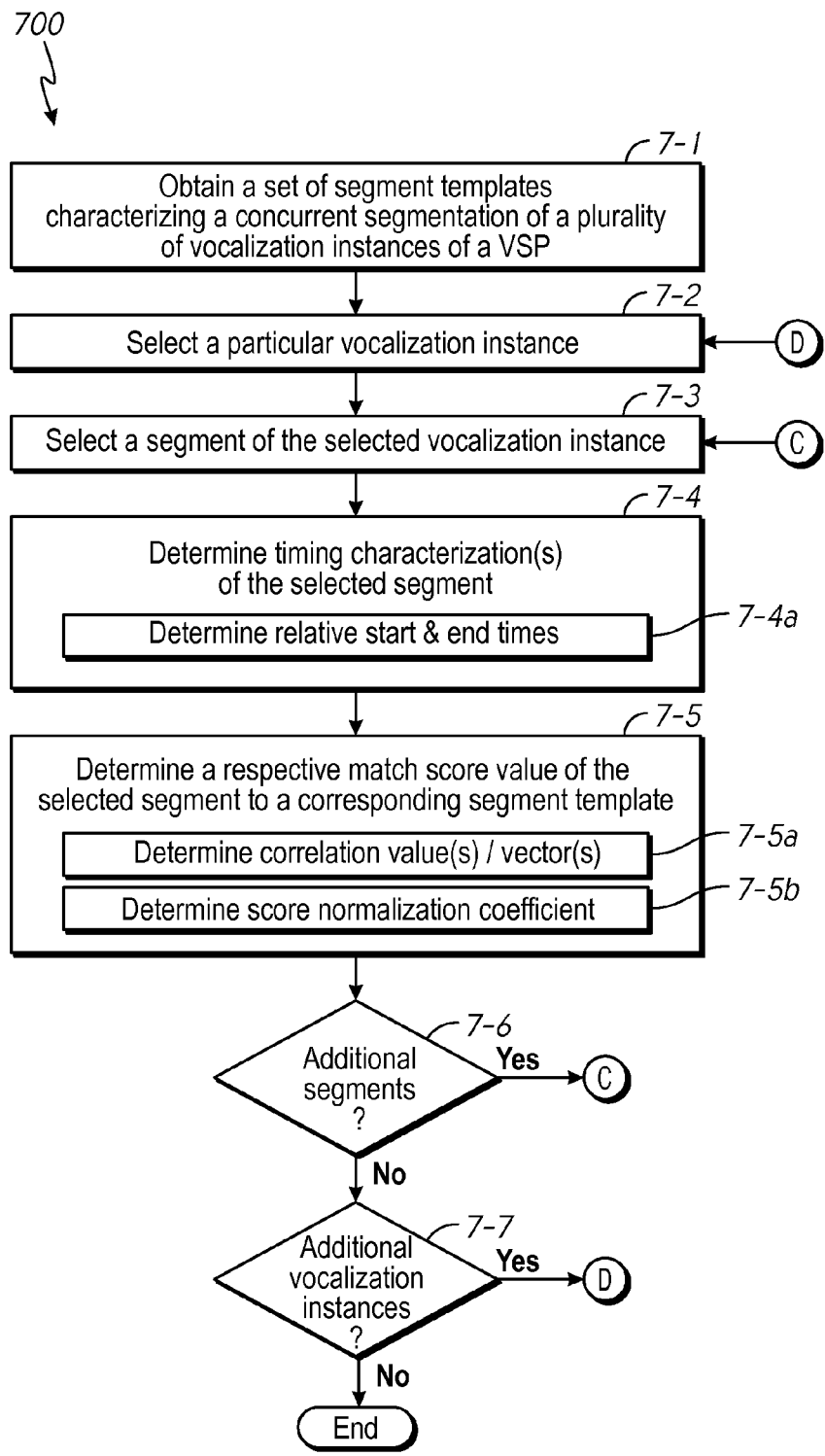
FIG. 7 is a flowchart representation of a method of generating VSP segment mappings associated with segment templates in accordance with some implementations.

FIG. 7 is a flowchart representation of a method 700 of generating VSP segment mappings associated with segment templates in accordance with some implementations. In some implementations, with continued reference to Figures land 5, the method 700 is performed by the VSP map generator module 650. Briefly, the method 700 includes generating at least one VSP segment mapping between a segment of a vocalization instance and a respective segment template, such that a VSP segment map provides a quantitative characterization of how respective segments of one of the plurality of vocalization instances varies in relation to a corresponding set of segment templates.

As represented by block 7-1, the method 700 includes obtaining a set of segment templates characterizing a concurrent segmentation of a plurality of vocalization instances of a VSP. For example, with reference to FIG. 5, the selection module 610 (of the VSP map generator module 650) retrieves a set of one or more segment templates from the VSP segment templates buffer 540. As represented by block 7-2, the method 700 includes selecting a particular vocalization instance. For example, with reference to FIGS. 3 and 5, the selection module 610 selects the second vocalization instance 320, which has respective segments 321, 322, 323, 324, 325, 326, 327 ($A_2$, $B_2$, $C_2$, $D_2$, $E_2$, $F_2$, $G_2$). As represented by block 7-3, the method 700 includes selecting a segment of the selected vocalization instance. For example, with reference to FIGS. 3 and 5, the selection module 610 selects the first segment 321 ($A_2$) of the second vocalization instance 320 and the corresponding segment template A (351).

As represented by block 7-4, the method 700 includes determining one or more timing characterization values for the selected segment. For example, with reference to FIG. 5, the timing characterization module 620 determines the one or more timing characterization values. In some implementations, as represented by block 7-4a, the one or more timing characterization values include the relative start and end times (i.e., time markers) for each of two or more segments of a vocalization instance. For example, in some implementations, with reference to Table 1.0 above, the start and end time markers are provided as time values that are relative to an earliest segment start time across all vocalization instances associated with a concurrent segmentation.

As represented by block 7-5, the method 700 includes determining a respective match score value of the selected segment to the corresponding segment template. For example, with reference to FIG. 5, the match scoring module 630 is configured to determine a respective match score value that quantitatively characterizes how closely a segment matches a corresponding segment template. As represented by block 7-5a, in some implementations, determining a match score value includes determining one or more correlation values or a correlation vector, that characterize the correlation of one or more values of the selected segment against a corresponding one or more values of the respective segment template. As represented by block 7-5b, in some implementations, determining a match score value includes determining a score normalization coefficient value for the selected segment (see, Table 1.0 above). For example, in some implementations, a score normalization coefficient value includes a mean of the inverse Euclidean distances between all the spectral feature vectors in a segment to a corresponding segment template (e.g., spectral features of $A_1$ versus the spectral features of segment template A). By defining the score normalization coefficient as the inverse of its segment score, each of the segments of the vocalization instances of the VSP will have a normalized score of less than or equal to 1.0 when compared to a respective segment template.

As represented by block 7-6, the method 700 includes determining whether or not there are additional segments of the selected vocalization instance to consider. If an additional segment has yet to be considered ("Yes" path from block 7-6), the method circles back to the portion of the method represented by block 7-3. On the other hand, if all of the segment positions have been considered ("No" path from block 7-6), as represented by block 7-7, the method 700 includes determining whether or not there are additional vocalization instances to consider within the concurrent segmentation. If an additional vocalization instance has yet to be considered ("Yes" path from block 7-7), the method circles back to the portion of the method represented by block 7-2. On the other hand, if all of the segment positions have been considered ("No" path from block 7-7), the current run of the method ends with the VSP segment maps stored in the VSP segment map buffer 640.

Figure 8:
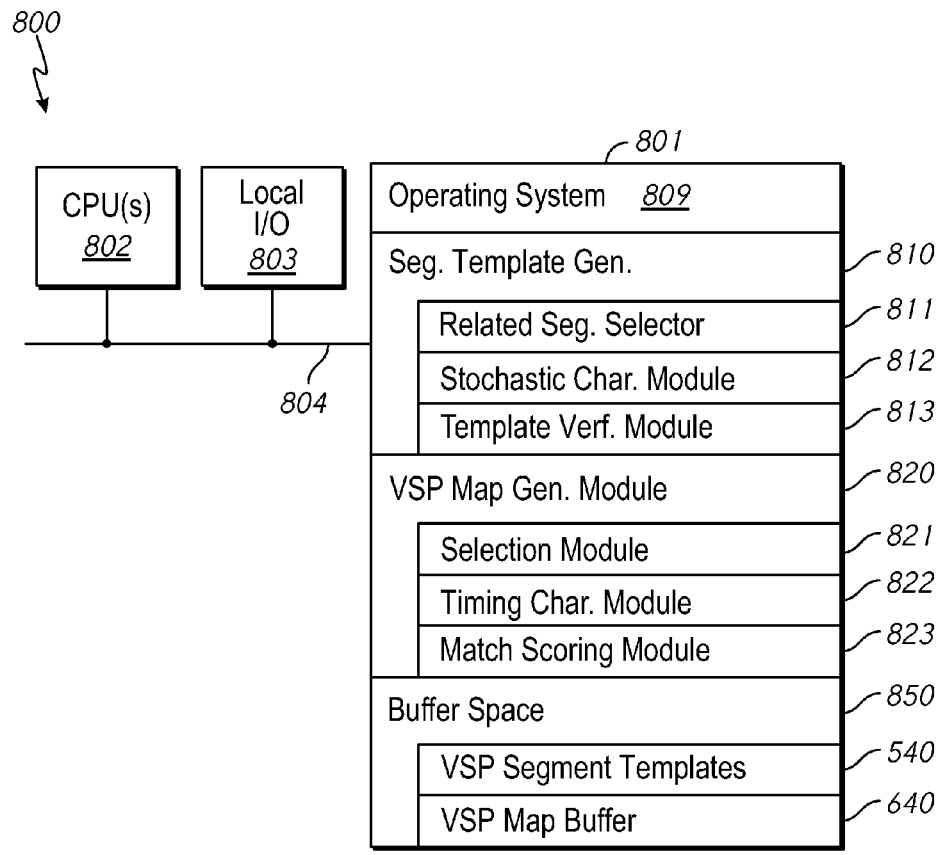
FIG. 8 is a schematic diagram of a system configured to generate segment templates and VSP segment mappings associated with multiple instances of a VSP as vocalized by a particular speaker in accordance with some implementations.

FIG. 8 is a schematic diagram of a system 800 configured to generate segment templates and VSP segment mappings associated with multiple instances of a VSP as vocalized by a particular speaker in accordance with some implementations. The system 800 illustrated in FIG. 8 is similar to and adapted from the segment template generator module 500 and the VSP map generator module 650 illustrated in FIG. 5. Elements common to each include common reference numbers, and only the differences between FIGS. 5 and 8 are described herein for the sake of brevity. Moreover, while pertinent features are illustrated, those skilled in the art will appreciate from the present disclosure that various other features have not been illustrated for the sake of brevity and so as not to obscure more pertinent aspects of the example implementations disclosed herein.

To that end, as a non-limiting example, in some implementations the system 800 includes one or more processing units (CPU's) 802, one or more local I/O (input/output) interfaces 803, an allocation of programmable logic and/or non-transitory memory (local storage) 801, and one or more communication buses 804 for interconnecting these and various other components not illustrated for the sake of brevity.

In some implementations, the communication buses 804 include circuitry that interconnects and controls communications between the various components. In various implementations the programmable logic and/or non-transitory memory 801 includes a suitable combination of a programmable gate array (such as an FPGA or the like), high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The programmable logic and/or non-transitory memory 801 optionally includes one or more storage devices remotely located from the CPU(s) 802. The programmable logic and/or non-transitory memory 801 comprises a non-transitory computer readable storage medium. In some implementations, the programmable logic and/or non-transitory memory 801 includes the following programs, modules and data structures, or a subset thereof including an optional operating system 809, a segment template generator module 810, a VSP map generator module 820, and a buffer space 850.

The operating system 809 includes procedures for handling various basic system services and for performing hardware dependent tasks. In some implementations, the operating system 809 includes some or all of an operating system executed by the CPU(s) 802.

In some implementations, the segment template generator module 810 includes a related segment selection module 811, a stochastic segment characterization module 812, an optional template verification module 813. In some implementations, the related segment selection module 811 is configured to select two or more related segments from across a concurrent segmentation of multiple vocalization instances of a VSP. To that end, the related segment selection module 811 includes computer program instructions and/or logic, and heuristics and metadata. In some implementations, the stochastic segment characterization module 812 is configured to generate a respective segment template by determining a stochastic characterization of the combination of the selected related segments, and store generated segment templates in the VSP segment template buffer 540. To that end, the stochastic segment characterization module 812 includes computer program instructions and/or logic, and heuristics and metadata. In some implementations, the template verification module 813 is configured to assess and characterize the quality of generated segment templates. To that end, the template verification module 813 includes computer program instructions and/or logic, and heuristics and metadata.

In some implementations, the VSP map generator module 820 includes a selection module 821, a timing characterization module 822, a match scoring module 813. In some implementations, the selection module 821 is configured to select a segment from a vocalization instance and a corresponding segment template in order to enable mapping between the selected segment and the corresponding segment template. To that end, the selection module 821 includes computer program instructions and/or logic, and heuristics and metadata. In some implementations, the timing characterization module 822 is configured to determine the relative start and end times (i.e., time markers) for each of two or more segments of a vocalization instance. To that end, the timing characterization module 822 includes computer program instructions and/or logic, and heuristics and metadata. In some implementations, the match scoring module 823 is configured to determine a respective match score value that quantitatively characterizes how closely a segment matches a corresponding segment template. To that end, the match scoring module 823 includes computer program instructions and/or logic, and heuristics and metadata.

In some implementations, the buffer space 750 includes the VSP segment template buffer 540, and the cumulative VSP buffer 232, and the VSP segment map buffer 640.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of generating one or more segment templates associated with a voiced sound pattern (VSP), the method comprising:

at an auditory processing system configured to synthesize segment templates modeling a VSP as uttered by a particular speaker, the auditory processing system including one or more audio sensors:

selecting two or more related segments associated with a respective segment position across a concurrent segmentation of a plurality of vocalization instances of a VSP, wherein each of the plurality of vocalization instances of the VSP has vocal characteristics of a particular speaker;

synthesizing a respective segment template by determining a function of spectral features of the selected two or more related segments, wherein the function provides a stochastic characterization of how a particular portion of the VSP is vocalized by the particular speaker according to the vocal characteristics and the plurality of vocalization instances of the VSP; and outputting the one or more segment templates to non-transitory memory through an output device.

2. The method of claim 1, wherein each of the plurality of vocalization instances of the VSP associated with the concurrent segmentation includes the same number of segments ($N_S$) as the others.

3. The method of claim 1, wherein determining the function of spectral features includes determining one or more stochastic central characterization (SCC) values of the two or more related segments.

4. The method of claim 3, wherein a SCC value corresponds to an aggregated central spectral characterization of the segment position as a whole.

5. The method of claim 3, wherein a SCC value corresponds to an aggregated central spectral characterization of a portion of the segment position.

6. The method of claim 3, wherein each of one or more SCC values corresponds to a function of mel-frequency cepstrum coefficients (MFCCs) of each of the two or more related segments, such that each SCC value corresponds to a respective MFCC position within the segment position.

7. The method of claim 3, wherein a SCC value includes at least one of a mean value, mode value, a median value and a median range.

8. The method of 3, wherein determining the function of spectral features further comprises determining a deviation characterization value (DCV) for each corresponding SCC value determined for the segment position.

9. The method of claim 8, wherein a DCV includes one of a standard deviation value, a variance value, and a variance range.

10. The method of claim 1, further comprising:
determining whether or not any of the two or more related segments associated with the segment position are statistical outliers with respect to the function of spectral features of the selected two or more related segments; and
determining a confidence metric associated with the segment template in response to determining that at least one of the two or more related segments is a statistical outlier.

11. The method of claim 1, further comprising generating a VSP segment mapping by:
selecting a segment of one of the plurality of vocalization instances of the VSP associated with the respective segment position and the segment template;
determining one or more timing characterization values for the selected segment; and
determining a respective match score value of the selected segment to the segment template.

12. The method of claim 11, wherein the one or more timing characterization values include relative start and end time markers for the selected segment.

13. The method of claim 12, wherein the start and end time markers include time values that are relative to an earliest segment start time across the plurality of vocalization instances associated with the concurrent segmentation.

14. The method of claim 11, wherein determining the match score value includes determining one or more correlation values, that characterize the correlation of one or more values of the selected segment against a corresponding one or more values of the segment template.

15. The method of claim 11, wherein determining the match score value includes determining a score normalization coefficient value for the selected segment.

16. The method of claim 15, wherein the score normalization coefficient value includes a mean of the inverse Euclidean distances between spectral feature vectors in the selected segment to the segment template.

17. A system provided to generate one or more segment templates associated with a voiced sound pattern (VSP), the system comprising:
one or more audio sensors configured to receive an audible signal and convert the audible signal into electronic audible signal data;
a related segment selection module configured to select, from the electronic audible signal data, two or more related segments associated with a respective segment position across a concurrent segmentation of a plurality of vocalization instances of a VSP, wherein each of the plurality of vocalization instances of the VSP has vocal characteristics of a particular speaker;
a stochastic segment characterization module configured to synthesize a respective segment template by determining a function of spectral features of the selected two or more related segments, wherein the function provides a stochastic characterization of how a particular portion of the VSP is vocalized by the particular speaker according to the vocal characteristics and the plurality of vocalization instances of the VSP; and
a segment template generator module configured to output the respective segment template to non-transitory memory through an output device.

18. The system of claim 17, wherein determining the function of spectral features includes determining one or more stochastic central characterization (SCC) values of the two or more related segments.

19. The system of claim 18, wherein determining the function of spectral features further comprises determining a deviation characterization value (DCV) for each corresponding SCC value determined for the segment position.

20. The system of claim 17, further comprising a VSP segment mapping module configured to:
select a segment of one of the plurality of vocalization instances of the VSP associated with the respective segment position and the segment template;
determine one or more timing characterization values for the selected segment; and
determine a respective match score value of the selected segment to the segment template.

* * * * *